April 13, 1954     H. C. BERRY     2,675,290
TACKLE BOX
Filed Sept. 7, 1949
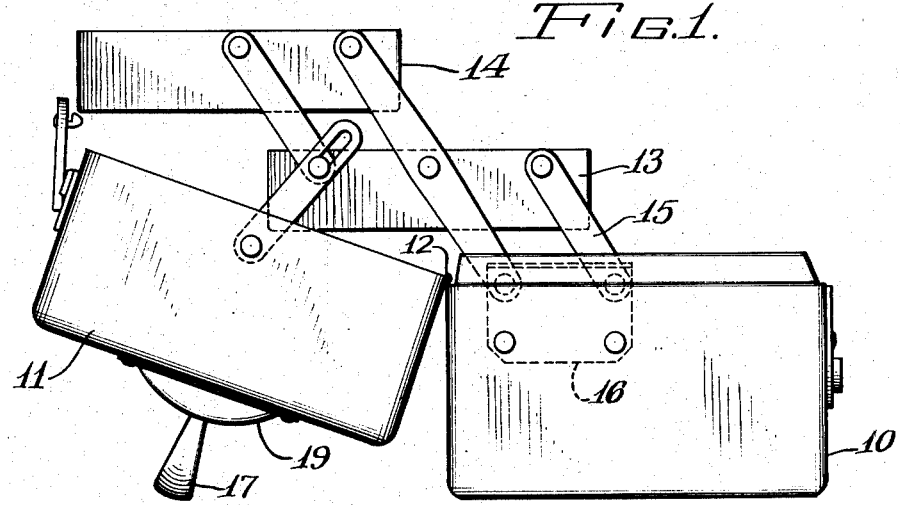
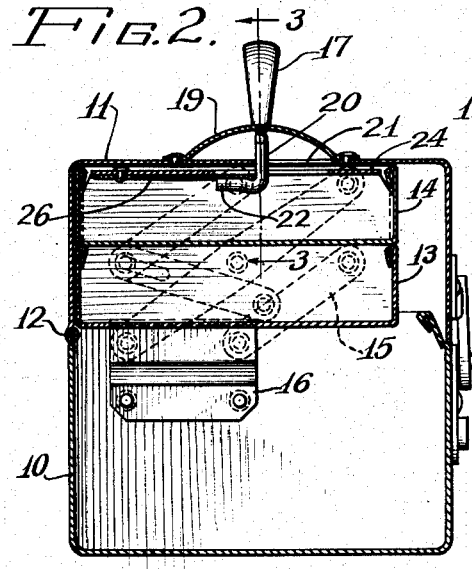
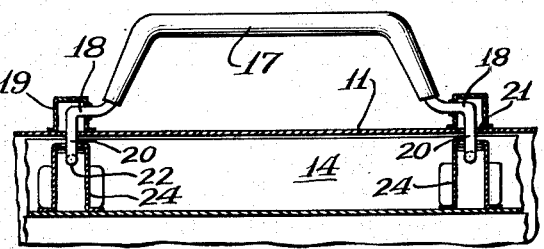
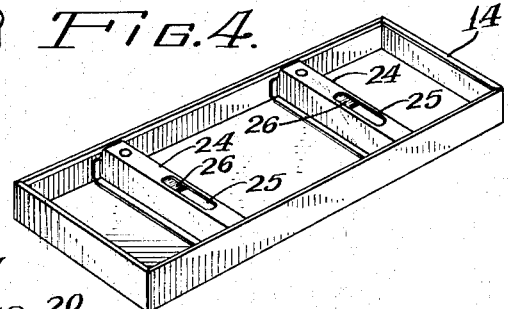
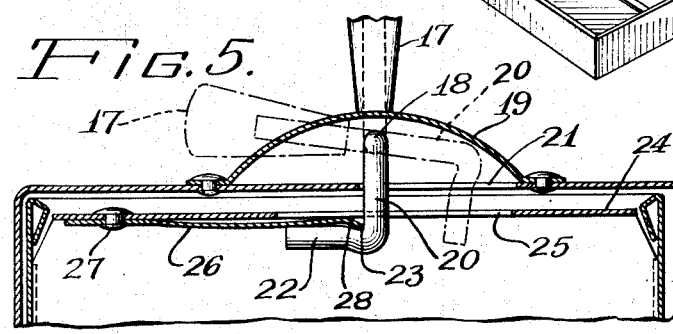
Inventor:
Herbert C. Berry
By Glenn S. Noble
Atty.

Patented Apr. 13, 1954

2,675,290

UNITED STATES PATENT OFFICE 2,675,290

TACKLE BOX

Herbert C. Berry, Chicago, Ill.

Application September 7, 1949, Serial No. 114,370

2 Claims. (Cl. 312—244)

This invention relates to carrying boxes which may be used for various purposes but which are particularly intended for fishing tackle and is of the character of the Tackle Box of my Patent No. 1,859,228. In view of the fact that various articles of fishing tackle including lures, bait or the like, have become very numerous and expensive, the owners are particularly desirous of having boxes which will safely and securely hold the various articles and will not be apt to spill the contents.

The principal object of the present invention is to provide an improved tackle box which will be neat and attractive in appearance and which will have means actuated by the handle for securely fastening or locking the cover and other parts in closed position.

Other objects and advantages will appear more fully from the following description taken in connection with the accompanying drawings in which:

Fig. 1 is an end view of my improved box with the cover shown in open position;

Fig. 2 is a cross sectional view showing the cover in closed position and the trays in normal carrying position;

Fig. 3 is a sectional view taken on the line 3—3 of Fig. 2;

Fig. 4 is a perspective view of the top tray; and

Fig. 5 is an enlarged sectional detail showing the cover in locking or fastening mechanism.

My improved carrying receptacle has a body or box portion proper 10 with a cover 11 hinged thereto at 12. The box has a plurality of trays 13 and 14 which are connected together and to the body and top by suitable linkage 15 such as heretofore used for this purpose. The linkage is such that when the cover is closed, the trays will be superimposed or nested in the box with the bottom tray resting on brackets or supports 16 secured to the ends of the box as shown in Figs. 1 and 2.

Various means have heretofore been proposed for locking or fastening the cover and trays in closed position by means of the handle, but such means have not proven entirely satisfactory.

One of the particular features of the present invention is the novel arrangement for utilizing the handle for interlocking the parts of the box together whereby they will be securely held and the cover is not apt to become inadvertently loosened. For this purpose, the handle 17 is provided at the ends with short trunnions 18 which are pivotally mounted in channel-shaped bearings or pivot members 19 which are riveted or otherwise secured to the cover 11. The ends of the trunnion or pivot members 18 are provided with hooks or catches 20 which extend inwardly through slots 21 in the cover. The extreme ends or engaging portions 22 of the hooks are bent upwardly at slightly more than 90° which provides re-entrant angles 23 as shown in Fig. 5. The top tray 14 has two inverted channels 24 which are secured therein by welding or riveting. The tops of these channels have slots 25 for receiving the hooks 20. The tops of the channels are also provided on their lower faces with elongated spring catches or detents 26 which are secured thereto at their outer ends by rivets 27. The free ends of these spring catches are preferably curved downwardly as shown at 28 and these ends project a sufficient distance beyond the ends of the slots 25 to permit the hooks to engage therewith.

This arrangement is such that if the cover is closed with the handle in raised position, the projecting ends of the hooks will merely depress the spring catches without any jar on the engaging parts. When it is desired to fasten or lock the cover, it is closed with the handle in depressed position as shown by dotted lines in Fig. 5, and then the handle is raised which will cause the hooks to engage with the detents of fastening members 26. The upward bending of the engaging ends 22 is such that when the handle is raised, the hooks tend to slightly raise the ends of the engaging members so that the curved ends will engage with the reentrant angles of the hooks. This will tend to hold the handle securely in raised position and will prevent inadvertent loosening of the cover which might otherwise cause spilling of the contents. When the box is to be opened, the handle is again swung to depressed position which will free the hooks and permit the raising of the cover. The provision of the channels 24 in the top trays tends to strengthen the construction and to provide particularly rigid and effective locking means to coact with the handles. As will readily be seen from Figs. 2 and 5, the left hand end of the tray 14 lies closely against the inner wall of the cover and the adjacent upper edges lie closely against the inner surface of the cover. For this reason, when the handle is raised and the hooks 20 pressed against the ends of the catches 26, the upper corner portion will impinge against the inner corner of the cover and be locked closely thereagainst. It will thus be seen that the cover and upper tray are locked together when the handle is raised and the upper tray is held by the linkage in fixed position with respect to the lower tray and the body 10. Any lifting strain placed upon the handle when in such locked position merely tends to hold these parts closely together and to hold the cover from opening. Applicant, as well as others, has for many years made boxes for fishing tackle, or the like, having trays which are raised by action of the cover through suitable linkage similar to that described herein. These boxes have had from one tray up to a plurality of trays, practically the only difference in construction being that the cover for a single tray will be of less height or merely sufficient to cover the single tray.

While I have shown a preferred form of my invention, it will be noted that the box may be provided with any desired key lock (not shown) and may otherwise be changed to accommodate different articles of tackle or tools without departing from the invention as set forth in the following claims.

I claim:

1. A box or chest comprising a body portion, a cover hinged to one side of the body portion, a handle pivotally mounted in bearings on the cover, hooks on said handle which project through slots in the cover, a plurality of trays mounted in the box, actuating links connecting said trays with the box and with the cover, the uppermost tray having inverted channels with slots in the tops thereof, resilient catch members secured in the channels and extending beyond the ends of the slots, the arrangement being such that the hooks will depress the ends of the catch members when the cover is closed with the handle in raised position, but will pass the ends of the catch members when the cover is closed with the handle in lowered position, whereby the hooks will engage the catch members to fasten the parts together when the handle is raised.

2. The combination with a tackle box having a body with a cover hinged thereto, of a plurality of trays mounted in superimposed positions in the box, actuating linkage connected with the box, the trays and the cover for raising the trays when the cover is opened, inverted channels mounted in the top tray and having slots in their upper web portions, resilient catches having the ends secured to said web portions and extending beyond the ends of the slots, a handle pivotally mounted on the cover and provided with hooks which extend inwardly through openings in the cover and which are adapted to engage with said catches for fastening the cover and trays in closed position, the parts being so arranged that if the cover is closed with the handle in carrying position, the hooks will depress the ends of the catches and such that if the cover is closed with the handle in lowered position, the hooks will engage with said catches for fastening the parts together when the handle is raised.

References Cited in the file of this patent

UNITED STATES PATENTS

| Number | Name | Date |
|---|---|---|
| 1,859,228 | Berry | May 17, 1932 |
| 1,882,756 | Boynton | Oct. 18, 1932 |
| 2,341,308 | Berry | Feb. 8, 1944 |
| 2,361,079 | Berry | Oct. 24, 1944 |
| 2,374,037 | Piker | Apr. 17, 1945 |